US012228887B2

(12) United States Patent
Hirayama

(10) Patent No.: US 12,228,887 B2
(45) Date of Patent: Feb. 18, 2025

(54) CASE AND TIMEPIECE

(71) Applicant: Casio Computer Co., Ltd., Tokyo (JP)

(72) Inventor: Sen Hirayama, Urayasu (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 629 days.

(21) Appl. No.: 17/496,282

(22) Filed: Oct. 7, 2021

(65) Prior Publication Data

US 2022/0026852 A1 Jan. 27, 2022

Related U.S. Application Data

(63) Continuation of application No. 16/786,154, filed on Feb. 10, 2020, now Pat. No. 11,181,865.

(30) Foreign Application Priority Data

Feb. 27, 2019 (JP) ................................ 2019-034611

(51) Int. Cl.
*G04B 37/00* (2006.01)

(52) U.S. Cl.
CPC ................................ *G04B 37/0008* (2013.01)

(58) Field of Classification Search
CPC .... G04B 37/0008; G04B 37/08; G04B 43/00; G04B 37/16; G04B 37/14; G04B 37/1486; G04B 43/002; G04G 17/08; A44C 5/14
See application file for complete search history.

(56) References Cited

U.S. PATENT DOCUMENTS

| | | | | |
|---|---|---|---|---|
| 4,692,033 A * | 9/1987 | Mock ................. | G04B 37/1486 968/339 |
| 4,831,607 A * | 5/1989 | Muller ................... | G04B 39/02 368/299 |
| 4,942,755 A | 7/1990 | Gogniat | |
| 5,373,484 A * | 12/1994 | Rappo ................ | G04B 37/1486 368/282 |
| 5,442,602 A | 8/1995 | Hirai et al. | |
| 8,585,282 B2 | 11/2013 | Shindo | |
| 11,181,865 B2 * | 11/2021 | Hirayama .............. | G04G 17/08 |
| 2011/0235475 A1 | 9/2011 | Shindo | |

(Continued)

FOREIGN PATENT DOCUMENTS

| | | |
|---|---|---|
| CN | 102200754 A | 9/2011 |
| JP | H01207687 A | 8/1989 |

(Continued)

OTHER PUBLICATIONS

First Office Action dated Feb. 8, 2021 received in Chinese Patent Application No. CN 202010119399.0 together with an English language translation.

(Continued)

*Primary Examiner* — Edwin A. Leon
(74) *Attorney, Agent, or Firm* — Scully, Scott, Murphy & Presser, P.C.

(57) ABSTRACT

A case including a case member having a back cover attached thereto, and a cover member which is arranged on a side of the back cover opposite to the case member side while covering an outer circumferential surface of the case member and on which band attachment sections are provided corresponding to the outer circumferential surface of the case member.

9 Claims, 4 Drawing Sheets

(56) References Cited

U.S. PATENT DOCUMENTS

| | | | |
|---|---|---|---|
| 2016/0124390 | A1 | 5/2016 | Kobayashi et al. |
| 2018/0292789 | A1 | 10/2018 | Ichimura |

FOREIGN PATENT DOCUMENTS

| | | | |
|---|---|---|---|
| JP | 2000-033004 | A | 2/2000 |
| JP | 2000088972 | A | 3/2000 |
| JP | 2000346960 | A | 12/2000 |
| JP | 2015010905 | A | 1/2015 |

OTHER PUBLICATIONS

Notice of Reasons for Refusal dated Feb. 16, 2021 received in Japanese Patent Application No. JP 2019-034611 together with an English language translation.
Office Action dated Apr. 20, 2021 received in U.S. Appl. No. 16/786,154.
Notice of Allowance dated Aug. 10, 2021 received in U.S. Appl. No. 16/786,154.
Notice of Reasons for Refusal dated Jan. 4, 2024 received in Japanese Patent Application No. JP 2023-001594.
Notice of Reasons for Refusal dated Nov. 15, 2022 received in Japanese Patent Application No. JP 2021-080475.

* cited by examiner

CASE AND TIMEPIECE

CROSS-REFERENCE TO RELATED APPLICATION

This application is a continuation application of U.S. patent application Ser. No. 16/786,154 filed on Feb. 10, 2020 and claims the benefit of priority from the prior Japanese Patent Application No. 2019-034611, filed Feb. 27, 2019, the entire contents of which are incorporated herein by reference.

BACKGROUND

1. Technical Field

The technical field relates to a case for an electronic device such as a wristwatch, a portable communication device, and a portable terminal and a timepiece equipped with the case.

2. Description of the Related Art

For example, a wristwatch is known which has a structure where band attachment sections called end lugs have been provided on outer circumferential portions of a wristwatch case having a back cover provided on its back surface, and watch bands have been attached to the band attachment sections, as described in Japanese Patent Application Laid-Open (Kokai) Publication No. 2000-033004.

In this type of wristwatch, each band attachment section is provided to project diagonally downward from an outer circumferential portion of the wristwatch case. Accordingly, in the structure thereof, each watch band is attached to the corresponding band attachment section with the lower part of the tip end of the band attachment section being positioned below the undersurface of the back cover.

SUMMARY

In accordance with one embodiment, there is provided a case comprising: a case member having aback cover attached thereto; and a cover member which is arranged on a side of the back cover opposite to the case member side while covering an outer circumferential surface of the case member and on which band attachment sections are provided corresponding to the outer circumferential surface of the case member.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

First Embodiment

A first embodiment applied in a wristwatch will hereinafter be described with reference to FIG. 1 to FIG. 3.

Figure 1:
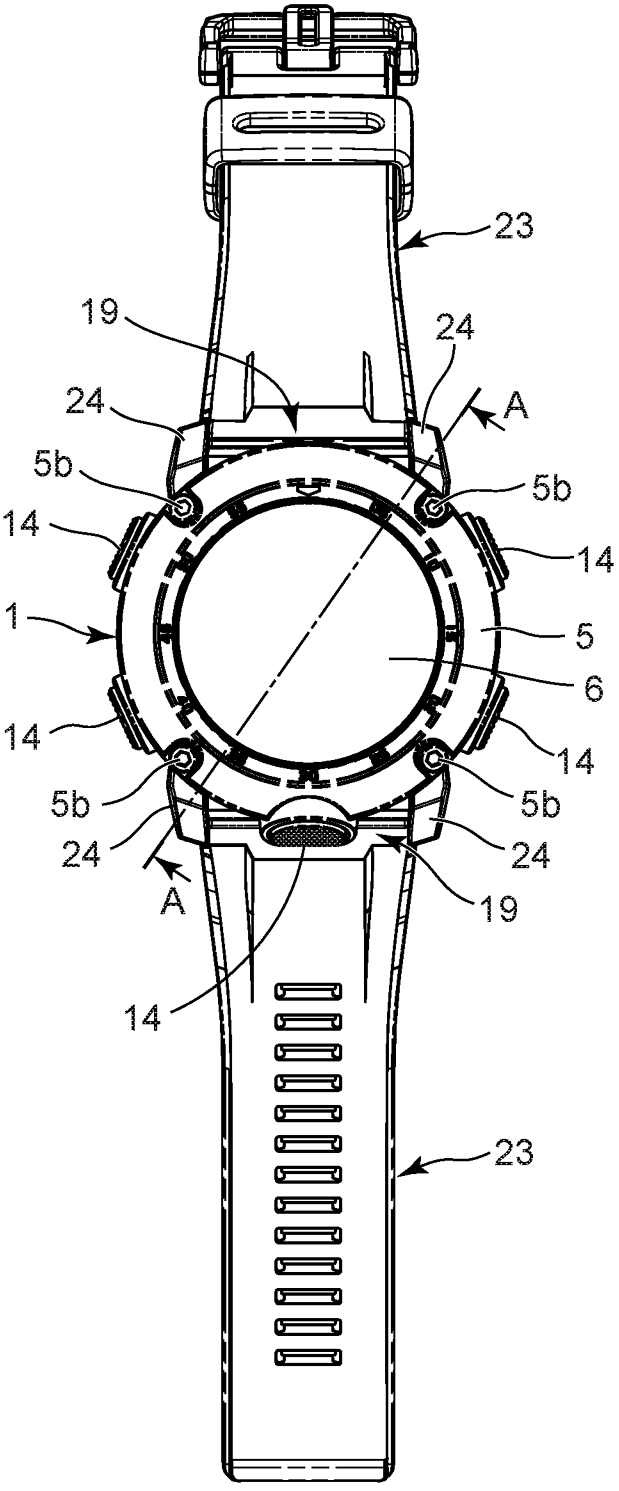
FIG. 1 is an enlarged front view of a first embodiment applied in a wristwatch.
Figure 2:
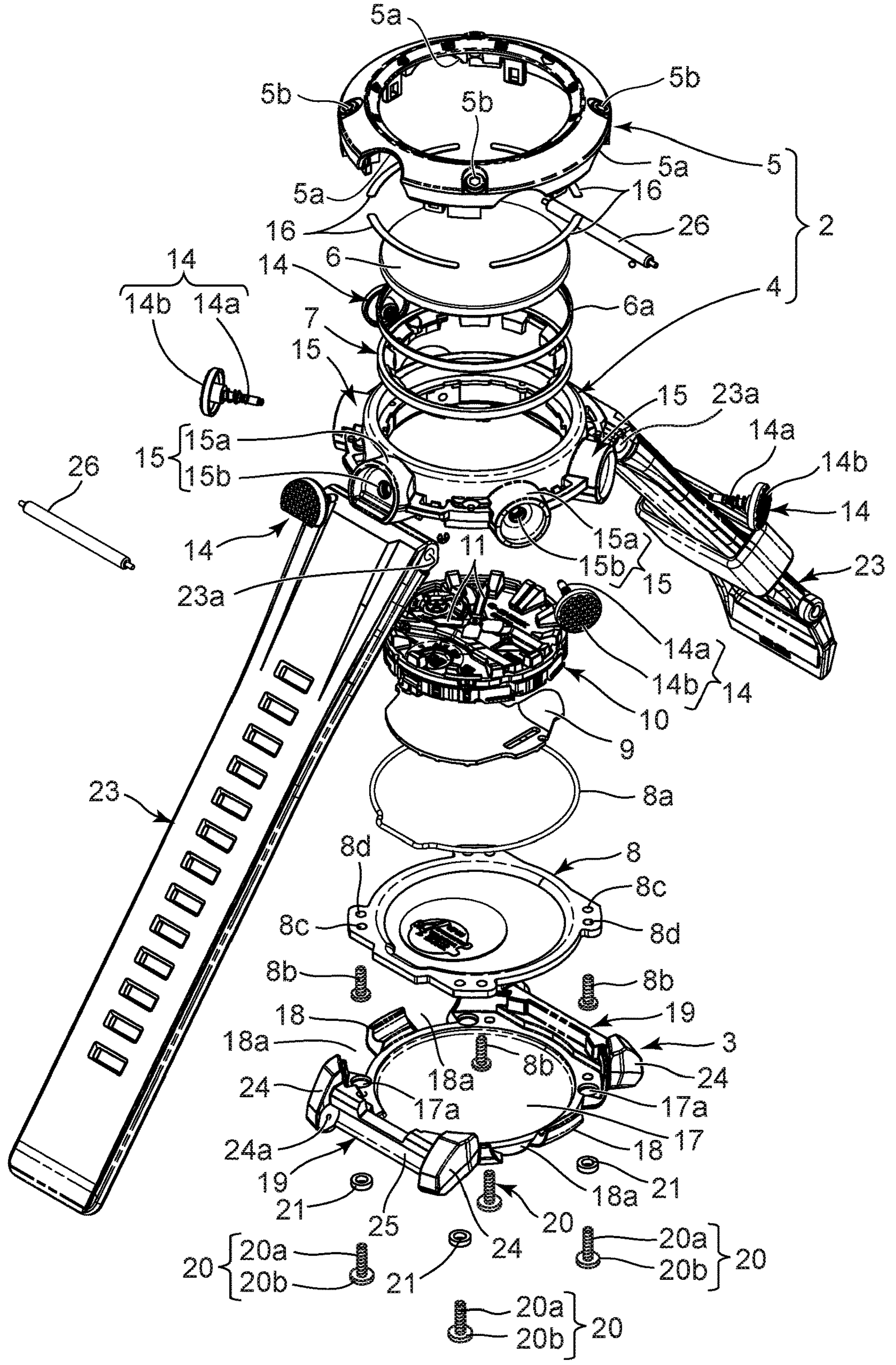
FIG. 2 is an exploded and enlarged perspective view of the wristwatch shown in FIG. 1.
Figure 3:
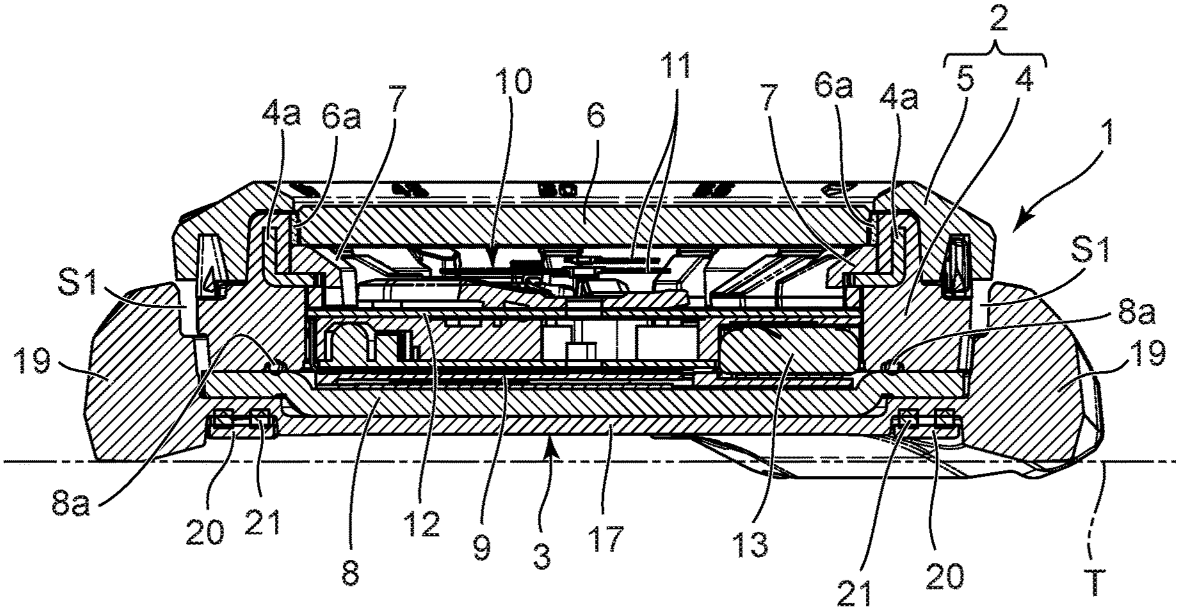
FIG. 3 is an enlarged cross-sectional view of the wristwatch taken along line A-A in FIG. 1.

This wristwatch has a wristwatch case 1, as shown in FIG. 1 to FIG. 3. The wristwatch case 1 includes a case member 2 and a cover member 3, and the case member 2 is constituted by a main body case 4 and an exterior case 5.

The main body case 4 is formed of metal or a hard synthetic resin such as that acquired by carbon fiber or glass fiber being mixed into polyamide resin so as to achieve high rigidity. This main body case 4 is formed in a substantially ring shape, and a metal reinforcement section 4*a* is mounted in the inner upper part of the main body case 4, as shown in FIG. 2 and FIG. 3.

To the upper opening of the main body case 4, a watch glass 6 is attached via a glass packing 6*a*, and a ring-shaped parting member 7 is arranged under this watch glass 6 so as to be positioned in the main body case 4, as shown in FIG. 2 and FIG. 3. Also, to the lower part of the main body case 4, a back cover 8 is attached by a plurality of first screws 8*b* via a waterproof ring 8*a*. This back cover 8 is provided with a plurality of first screw insertion holes 8*c* into which a plurality of first screws 8*b* are inserted.

Inside the main body case 4, a timepiece module 10 is arranged via a buffer sheet 9, as shown in FIG. 2 and FIG. 3. This timepiece module 10 includes various electronic components required for a timepiece function, such as a timepiece movement (not shown) for indicating and displaying clock time by moving pointers 11, a display section (not shown) for electrooptically displaying information such as time and date, a circuit board 12 for driving and controlling these sections, and a battery 13 for supplying electric power to the circuit board 12.

On the 2 o'clock side, 4 o'clock side, 6 o'clock side, 8 o'clock side, and 10 o'clock side of the outer circumference of the main body case 4, button attachment sections 15 for press button switches 14 are provided, respectively, as shown in FIG. 1 and FIG. 2. Each of these button attachment sections 15 includes a cylindrical section 15*a* projecting toward the outside of the main body case 4, and a through hole 15*b* penetrating through the main body case 4 at the center of the cylindrical section 15*a*.

Also, each of the press button switches 14 includes an operation shaft 14*a* that is slidably inserted into the corresponding through hole 15*b*, and a button head 14*b* that is provided on the outer end of the operation shaft 14*a* and arranged in the corresponding cylindrical section 15*a*, as shown in FIG. 2. Each push button switch 14 is structured such that, when the button head 14*b* is pressed from the outside of the main body case 4, the operation shaft 14*a* is slid in the through hole 15*b*, and the inner end of the operation shaft 14*a* is pushed into the main body case 4 and presses a contact section (not shown) of the timepiece module 10 so that the contact section performs a switch operation.

On the other hand, the exterior case 5 is formed using a soft synthetic resin such as urethane resin and has a ring shape that covers the upper outer circumference of the main body case 4, as shown in FIG. 1 to FIG. 3. This exterior case 5 is attached to the upper part of the main body case 4 by double-sided adhesive tape 16 while covering the upper outer circumference of the main body case 4. In outer circumferential portions of the exterior case 5, a plurality of arc-shaped first notch sections 5*a* are provided corresponding to the outer peripheries of the upper parts of the cylindrical sections 15*a* of the button attachment sections 15 on the main body case 4.

Each of these first notch sections 5*a* is formed in an arc shape whose lower portion is open, as shown in FIG. 2. That is, the exterior case 5 is structured such that, when it is arranged on the upper outer circumferential portion of the main body case 4, the outer peripheries of the upper parts of the cylindrical sections 15*a* of the button attachment sections 15 on the main body case 4 are positioned in the plurality of first notch sections 5*a*, respectively. On the upper surface of the exterior case 5, a plurality of decorative pieces 5*b* are provided.

The cover member 3 includes a cover main body 17 that is arranged on the undersurface of the back cover 8, an outer circumferential cover section 18 that is arranged on outer circumferential portions of the main body case 4, and band attachment sections 19 provided on the 12 o'clock side and the 6 o'clock side of the outer circumferential cover section 18, and these sections are integrally formed using synthetic resin, as shown in FIG. 1 to FIG. 3.

More specifically, the cover member 3 is formed of a hard synthetic resin such as that acquired by carbon fiber or glass fiber being mixed into polyamide resin so as to achieve high rigidity, as shown in FIG. 1 to FIG. 3. The cover main body 17 of the cover member 3 is formed in a disk shape and structured to be attached to the back cover 8 by a plurality of second screws 20.

This cover main body 17 is provided with a plurality of second screw insertion holes 17*a* into which the plurality of second screws 20 is inserted through a plurality of ring-shaped buffer members 21, as shown in FIG. 2 and FIG. 3. Each of these buffer members 21 is structured to be pressed against the undersurface of the cover main body 17 by the head section 20*b* of the corresponding second screw 20 when the screw sections 20*a* of the plurality of second screws 20 are inserted and screwed into the back cover 8.

That is, in the back cover 8, a plurality of screw holes 8*d* into which the plurality of second screws 20 is screwed is provided corresponding to the plurality of second screw insertion holes 17*a* of the cover main body 17, as shown in FIG. 2 and FIG. 3. As a result, the cover main body 17 is structured such that it is attached to the back cover 8 by the plurality of second screws 20 being inserted into the plurality of second screw insertion holes 17*a* through the ring-shaped buffer members 21 and screwed into the plurality of screw holes 8*d* of the back cover 8 so as to be fastened to the back cover 8.

On the other hand, the outer circumferential cover section 18, which is formed in a substantially ring shape, is provided on and covers the outer circumferential portion of the cover main body 17, as shown in FIG. 2. In this outer circumferential cover section 18, a plurality of arc-shaped second notch sections 18*a* is provided corresponding to the lower parts of the cylindrical sections 15*a* of the button attachment sections 15 on the main body case 4.

That is, the outer circumferential cover section 18 is structured such that, when it is arranged on the outer circumferential portion of the main body case 4, the lower parts of the cylindrical sections 15*a* of the button attachment portions 15 on the main body case 4 are housed in the plurality of second notch sections 18*a*, respectively, as shown in FIG. 2. In addition, the outer circumferential cover section 18 is structured to be arranged with its upper rim being close to or in contact with the lower rim of the outer circumferential portion of the exterior case 5 attached to the upper outer circumferential portion of the main body case 4.

Note that the outer circumferential cover section 18 may be structured such that, when the cover main body 17 is attached to the undersurface of the back cover 8 and arranged on the outer circumferential portion of the main body case 4, the inner circumferential surface of the outer circumferential cover section 18 is positioned near or comes in contact with the outer circumferential surface of the main body case 4, or a space equivalent to the later-described space S1 between each band attachment section 19 and the main body case 4 is formed between the inner circumferential surface of the outer circumferential cover section 18 and the main body case 4.

As a result, the outer circumferential cover section 18 is structured to perform impact buffering when the wristwatch case 1 receives an external impact with the cover main body 17 being attached to the undersurface of the back cover 8 and arranged on the outer circumferential portion of the main body case 4, as shown in FIG. 3. Note that the outer circumferential cover section 18 should preferably be structured to perform impact buffering by being flexurally deformed toward the outer circumferential surface of the main body case 4 by use of the space between the inner circumferential surface of the outer circumferential cover section 18 and the outer circumferential surface of the main body case 4.

The band attachment sections 19 are to attach the watch bands 23 to the 12 o'clock side and the 6 o'clock side of the wristwatch case 1, and each of which includes a pair of attachment projections 24 and a band reception section 25, as shown in FIG. 1 and FIG. 2. The pair of attachment projections 24 is provided projecting diagonally downward from the outer circumferential cover section 18.

Also, each attachment projection 24 is provided to be inclined diagonally downward such that its inner end surface on the main body case 4 side is arranged close to the outer circumferential surface of the main body case 4, and a lower portion of its outer end is positioned lower than the undersurface of the cover main body 17, as shown in FIG. 1 and FIG. 2.

Also, in an area between the inner end surface of each attachment projection 24 on the main body case 4 side and the outer circumferential surface of the main body case 4, the space S1 is formed, as shown in FIG. 3. This space S1 is provided so that, when the pair of attachment projections 24 receives an impact from below, their inner end portions are flexurally deformed to come close to the outer circumferential surface of the main body case 4.

Also, each attachment projection 24 is arranged such that its upper inner end is close to or in contact with the lower rim of the outer circumferential portion of the exterior case 5 provided on the upper outer circumference portion of the main body case 4, as shown in FIG. 3. That is, each attachment projection 24 is structured to be flexurally deformed such that its inner end portion approaches the outer circumferential surface of the main body case 4 when its lower outer end is pressed upward.

Also, each band attachment section 19 is structured such that an end portion of the corresponding watch band 23 can be rotatably attached by a connection pin 26 with this end portion being arranged between the pair of attachment projections 24, as shown in FIG. 1 and FIG. 2. That is, in each pair of attachment projections 24, a pair of attachment holes 24*a* into which the end portions of the corresponding coupling pin 26 are inserted for attachment is coaxially provided opposing each other.

This coupling pin 26 is a spring rod, and is inserted into a pin insertion hole 23*a* provided in the end portion of each watch band 23, as shown in FIG. 2. Both ends of this coupling pin 26 protrude from the pin insertion hole 23*a* to the outside, and are retractably inserted into the attachment holes 24*a* of the corresponding pair of attachment projections 24, so that the end portion of the watch band 23 is rotatably attached with it being arranged between the pair of attachment projections 24.

Each band reception section 25 is to receive the undersurface of the end portion of the corresponding watch band 23 arranged between the pair of attachment projections 24, and is provided on a lower portion between the pair of attachment projections 24 with it being inclined diagonally downward as with the pair of attachment projections 24, as shown in FIG. 2.

Also, each band reception section 25 is formed such that its length in the longitudinal direction of the corresponding watch band 23 is shorter than the projection length of the corresponding pair of attachment projections 24, as shown in FIG. 2. As a result, each watch band 23 is structured to be rotated around the corresponding coupling pin 26 with it being attached between the corresponding pair of attachment projections 24 by the coupling pin 26.

That is, each band attachment section 19 is structured such that, when the corresponding coupling pin 26 that is a spring rod is to be arranged between the pair of attachment projections 24 after it is inserted into the pin insertion hole 23*a* in the end portion of the corresponding watch band 23 and its both end portions protrude from the sides of the pin insertion hole 23*a*, the end portions of the protruding coupling pin 26 are pressed into the inner side of the coupling pin 26, whereby the end portion of the watch band 23 is arranged between the pair of attachment projections 24, as shown in FIG. 2.

Also, each band attachment section 19 is structured such that, when the end portion of the corresponding watch band 23 is arranged between the pair of attachment projections 24 with both end portions of the corresponding coupling pin 26 being pressed inward, the undersurface of the end portion of the watch band 23 is pressed against the band reception section 25 and, in this state, the end portions of the coupling pin 26 are inserted into the respective attachment holes 24*a* of the pair of attachment projections 24, as shown in FIG. 2. As a result, the end portion of the watch band 23 is rotatably attached to the band attachment section 19.

In addition, each band attachment section 19 is structured such that, if the wristwatch case 1 is dropped face up and the lower outer end portions of the pair of attachment projections 24 projecting below the cover main body 17 come in contact with a contact surface T, the lower outer end portions of these attachment projections 24 are deformed to be pressed upward, and the inner end portions thereof are flexurally deformed to approach the outer circumferential surface of the main body case 4, whereby the impact is mitigated, as shown in FIG. 2 and FIG. 3.

Next, the mechanism of this wristwatch is described.

In the assembly of this wristwatch, first, the case member 2 is assembled. Here, the ring-shaped parting member 7 is arranged on the upper opening of the main body case 4, the watch glass 6 and the glass packing 6*a* are attached thereto in this state, and the parting member 7 is pressed against and fixed to the main body case 4 by the watch glass 6.

In this state, the exterior case 5 is attached to the upper outer circumferential portion of the main body case 4 by the double-sided adhesive tape 16. Here, the plurality of arc-shaped first notch sections 5*a* provided in the exterior case 5 are positioned corresponding to the outer peripheries of the upper parts of the cylindrical sections 15*a* of the plural button attachment sections 15 on the main body case 4, respectively, and the outer peripheries of the upper parts of the plurality of cylindrical sections 15*a* are arranged in the plurality of first notch sections 5*a*, respectively. As a result, the case member 2 is assembled.

Then, the watch module 10 is inserted into the main body case 4 from below and housed therein. In this state, the plurality of press button switches 14 are attached to the plurality of button attachment sections 15 provided on the 2 o'clock side, 4 o'clock side, 6 o'clock side, 8 o'clock side, and 10 o'clock side of the outer peripheral portion of the main body case 4.

Here, the operation shafts 14*a* of the plurality of press button switches 14 are inserted from the outside of the main body case 4 into the through holes 15*b* of the main body case 4 at the centers of the cylindrical sections 15*a* of the plurality of button attachment sections 15, respectively, and the button heads 14*b* of the plurality of press button switches 14 are arranged in the cylindrical sections 15*a* of the plurality of button attachment sections 15, respectively.

Then, the inner end portions of the operation shafts 14*a* of the plurality of press button switches 14 are pushed into the main body case 4 and arranged corresponding to the plurality of contact sections (not shown) of the timepiece module 10 in the main body case 4, respectively. As a result, the plurality of press button switches 14 are attached to the plurality of button attachment sections 15 of the main body case 4 with the plurality of contact sections of the timepiece module 10 being operable.

Subsequently, the buffer sheet 9 is arranged under the timepiece module 10, and the back cover 8 and the waterproof ring 8*a* are attached to the undersurface of the main body case 4 by the plurality of first screws 8*b*. Here, the plurality of first screws 8*b* are inserted into the plurality of first screw insertion holes 8*c* of the back cover 8, respectively, and screwed into the lower part of the main body case 4 so as to be tightened. As a result, the back cover 8 is attached to the undersurface of the main body case 4.

Then, the cover member 3 is attached to the undersurface of the back cover 8. Here, the cover main body 17 of the cover member 3 is arranged on the undersurface of the back cover 8, the outer circumferential cover section 18 is arranged corresponding to the outer circumference of the main body case 4, and the band attachment sections 19 are arranged corresponding to the 12 o'clock side and the 6 o'clock side of the main body case 4, respectively.

Here, the plurality of second notch sections 18*a* provided in the outer circumferential cover section 18 are positioned corresponding to the lower parts of the cylindrical sections 15*a* of the plurality of button attachment sections 15 on the main body case 4, and the lower parts of the cylindrical sections 15*a* of the plurality of button attachment sections 15 are housed in the plurality of second notch sections 18*a*, respectively.

As a result, the outer circumferential surface of the main body case 4 and the inner circumferential surface of the outer circumferential cover section 18 are arranged close to or in contact with each other, or the outer circumferential surface of the main body case 4 and the inner circumferential surface of the outer circumferential cover section 18 are arranged with the space (not shown) equivalent to the space S1 for each band attachment section 19 therebetween. In this state, the upper rim of the outer circumferential cover section 18 is arranged close to or in contact with the lower rim of the outer circumferential portion of the exterior case

5 attached to the upper outer circumferential portion of the main body case 4. Accordingly, the outer circumferential portion of the main body case 4 is covered by the outer circumferential portion of the exterior case 5 and the outer circumferential cover section 18 of the cover member 3.

Also, here, the band attachment sections 19 are arranged on the outer circumferential portions of the main body case 4 on the 12 o'clock side and the 6 o'clock side. In addition, the space S1 is formed between the inner end surfaces of the pair of attachment projections 24 of each band attachment section 19 and the outer circumferential surface of the main body case 4, and the upper inner ends of each pair of attachment projections 24 are arranged close to or in contact with the lower rim of the outer circumferential portion of the exterior case 5 attached to the upper outer circumferential portion of the main body case 4.

Then, the plurality of second screw insertion holes 17*a* provided in the cover main body 17 is positioned corresponding to the plurality of screw holes 8*d* provided in the back cover 8. In this state, the plurality of second screws 20 is respectively inserted into the plurality of ring-shaped buffer members 21, so that these buffer members 21 are attached to the plurality of second screws 20.

Here, the plurality of second screws 20 to which the plurality of buffer members 21 has been attached are inserted into the plurality of second screw insertion holes 17*a* of the cover main body 17, respectively, and screwed into the plurality of screw holes 8*d* of the back cover 8. As a result, the cover member 3 is attached to the undersurface of the back cover 8 with the plurality of buffer members 21 being resiliently pressed against the undersurface of the cover main body 17 of the cover member 3 by the head sections 20*b* of the plurality of second screws 20.

As a result, the assembly of the wristwatch case 1 is completed with the back cover 8 on the undersurface of the main body case 4 being covered by the cover main body 17, the upper outer circumferential portion of the main body case 4 being covered by the exterior case 5, and the outer circumference of the main body case 4 being covered by the outer circumferential portion of the exterior case 5 and the outer circumferential cover section 18 of the cover member 3.

Then, the watch bands 23 are attached to the band attachment sections 19 of the cover member 3. Here, first, each coupling pin 26 is inserted into the pin insertion hole 23*a* in the end portion of the corresponding watch band 23, and both ends of the coupling pin 26 are protruded from both sides of the pin insertion hole 23*a*. In this state, when the end portion of the watch band 23 is to be arranged between the corresponding pair of attachment projections 24, both ends of the protruding coupling pin 26 are pushed inward and then the end portion of the watch band 23 is arranged between the pair of attachment projections 24.

Here, the undersurface of the end portion of the watchband 23 arranged between the pair of attachment projections 24 is arranged on the band reception section 25, and the ends of the coupling pin 26 are positioned corresponding to the pair of attachment holes 24*a* provided in the pair of attachment projections 24. Then, both ends of the coupling pin 26 are pushed outward from both sides of the end portion of the watch band 23 and inserted into the pair of attachment holes 24*a*, respectively. As a result, the end portion of each watch band 23 is rotatably attached to the corresponding band attachment section 19 of the cover member 3, and the assembly of the wristwatch is completed.

In this wristwatch, the cover member 3 is attached to the undersurface of the back cover 8 while covering the outer circumferential portion of the case member 2. Accordingly, when the wristwatch case 1 receives an impact from the outer circumference side, this impact is mitigated by the cover member 3. As a result, the case member 2 is favorably protected by the cover member 3, or in other words, the impact resistance is increased.

That is, when the wristwatch case 1 receives an impact from the back surface side, the cover member 3 protects the back cover 8 and the main body case 4 from the impact on the back surface side by the cover main body 17 arranged on the undersurface of the back cover 8. When the wristwatch case 1 receives an impact from the outer circumference side, the main body case 4 is protected from this impact by the outer circumferential portion of the exterior case 5, the outer circumferential cover section 18 arranged around the outer circumference of the main body case 4, and the band attachment sections 19.

When the wristwatch is dropped face up and comes in contact with the contact surface T of a floor or the like, the lower outer end portions of the pair of attachment projections 24 of each band attachment section 19 on the cover member 3 come in contact with the contact surface T, and the band attachment sections 19 receive the impact. Here, the pair of attachment projections 24 of each band attachment section 19 is flexurally deformed such that the inner end portions thereof approach the outer circumferential surface of the main body case 4, whereby the impact is absorbed.

That is, the space S1 has been formed between the inner end surfaces of the pair of attachment projections 24 of each band attachment section 19 and the outer circumferential surface of the main body case 4, and the upper inner ends of the pair of attachment projections 24 have been arranged close to or in contact with the lower rim of the outer circumferential portion of the exterior case 5 attached to the upper outer circumferential portion of the main body case 4. Therefore, when the lower outer end portions of the pair of attachment projections 24 of each band attachment section 19 come in contact with the contact surface T, these lower outer end portions of the pair of attachment projections 24 are pressed upward.

Along with this movement, the pair of attachment projections 24 of each band attachment section 19 is flexurally deformed toward the outer circumferential surface of the main body case 4 with the lower portion of the outer circumferential cover section 18 on the outer circumferential portion of the cover main body 17 as a fulcrum. As a result of this structure, since the pairs of attachment projections 24 are flexurally deformed toward the outer circumferential surface of the main body case 4, impacts due to the drop of the wristwatch case 1 are mitigated. Accordingly, the watch module 10 in the watch case 1 is prevented from being affected by the impacts.

In such a case, when the pairs of attachment projections 24 are flexurally deformed toward the outer circumferential surface of the main body case 4, and the cover main body 17 of the cover member 3 is pressed against the contact surface T, the impact is mitigated by the plurality of buffer members 21 pressed against the undersurface of the back cover 8 by the head sections 20*b* of the plurality of second screws 20.

Also, when the wristwatch case 1 receives an impact from above, since the exterior case 5 provided on the upper outer circumferential portion of the main body case 4 is made of a soft synthetic resin such as urethane resin, this impact from above is mitigated by the exterior case 5, whereby the main body case 4 is prevented from directly receiving the impact.

As described above, in the present embodiment, the wristwatch having high impact resistance can be provided by including the case member 2 whose undersurface that is the back surface has the back cover 8 attached thereto, and the cover member 3 which is attached to the undersurface of the back cover 8 while covering the outer circumferential portion of the case member 2 and on which the band attachment sections 19 are provided corresponding to the outer circumference of the case member 2.

That is, in this wristwatch, the cover member 3 is attached to the undersurface of the back cover 8 while covering the outer circumferential portion of the case member 2. Accordingly, even if the wristwatch case 1 receives an external impact, this impact can be mitigated by the cover member 3, whereby the case member 2 can be favorably protected. That is, products having high impact resistance can be provided.

Also, in this wristwatch, the space S1 is formed between the outer circumferential surface of the case member 2 and the inner end portions of the band attachment sections 19 of the cover member 3 corresponding thereto. Accordingly, when the wristwatch case 1 receives an external impact, the band attachment sections 19 are favorably deformed toward the outer circumferential surface of the case member 2 by the space S1 between the outer circumferential surface of the case member 2 and the inner end surfaces of the band attachment sections 19. As a result, the impact received by the wristwatch case 1 is favorably mitigated by the band attachment sections 19 of the cover member 3.

Moreover, in this wristwatch, the case member 2 includes the hard body case 4 and the soft exterior case 5 provided on the upper outer circumferential portion of the main body case 4. Accordingly, when the wristwatch case 1 receives an impact from above, this impact can be mitigated by the soft exterior case 5. That is, the hard body case 4 can be favorably protected by the soft exterior case 5. By this structure as well, the impact resistance can be ensured.

Furthermore, in this wristwatch, the space S1 is formed between the outer circumferential surface of the main body case 4 and the inner end surfaces of the band attachment sections 19 of the cover member 3 corresponding thereto, that is, the inner end surfaces of the pair of attachment projections 24 of each band attachment section 19. Accordingly, when the wristwatch case 1 receives an external impact, the pair of attachment projections 24 of each band attachment section 19 is deformed toward the outer circumferential surface of the case member 2 by using the space S1 between the outer circumferential surface of the case member 2 and the inner end surfaces of the pair of attachment projections 24, whereby the impact received by the wristwatch case 1 can be reliably and favorably mitigated by the band attachment sections 19.

Still further, in this wristwatch, the lower outer end portions of the pair of attachment projections 24 of each band attachment section 19 on the cover member 3 are provided to project below the undersurface of the cover main body 17 of the cover member 3. Accordingly, when the wristwatch case 1 is dropped face up and the lower outer end portions of each pair of attachment projections 24 come in contact with the contact surface T of a floor or the like, these attachment projections 24 can be deformed such that the lower outer end portions are pressed upward.

In addition, in this wristwatch, each pair of attachment projections 24 pressed upward by a drop impact can be flexurally deformed such that their inner end portions approach the outer circumferential surface of the case member 2. Accordingly, the impact received by the wristwatch case 1 being dropped can be reliably and favorably mitigated by the band attachment sections 19.

Also, in this wristwatch, the lower rim of the outer circumferential portion of the exterior case 5 is arranged close to or in contact with the upper end portions of the pair of attachment projections 24 of each band attachment section 19 on the cover member 3. Accordingly, when the wristwatch case 1 receives an impact by being dropped, the pair of band attachment sections 19 of each band attachment section 19 is unfailingly and favorably deformed toward the outer circumferential surface of the case member 2 without being blocked by the exterior case 5, and the impact received by the wristwatch case 1 being dropped can be reliably and favorably mitigated by the band attachment sections 19.

Moreover, in this wristwatch, the cover member 3 is attached to the back cover 8 by the plurality of second screws 20 via the plurality of buffer members 21. Accordingly, when the cover member 3 receives an impact from its back surface side, this impact can be mitigated by the plurality of buffer members 21. That is, when the cover main body 17 of the cover member 3 is pressed against the contact surface T, the impact can be favorably mitigated by the plurality of buffer members 21 pressed against the undersurface of the back cover 8 by the head sections **20*b* of the plurality of second screws 20**.

Second Embodiment

Next, a second embodiment applied in a wristwatch is described with reference to FIG. 4. Sections that are the same as those of the first embodiment shown in FIG. 1 to FIG. 3 are described using the same reference numerals.

Figure 4:
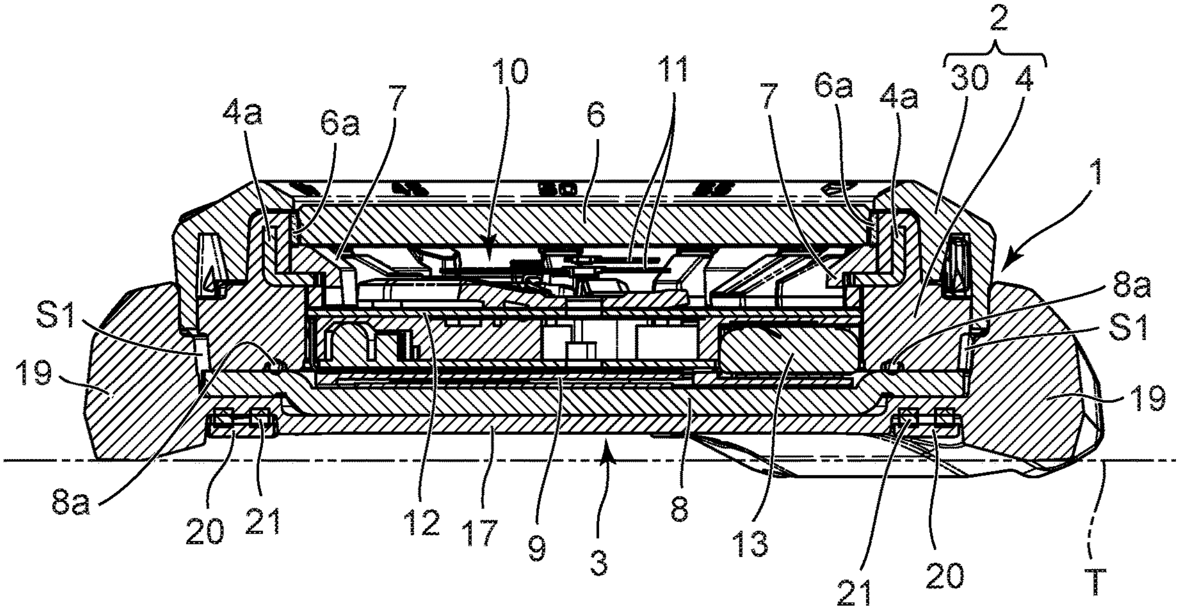
FIG. 4 is an enlarged cross-sectional view of a main part of a second embodiment applied in a wristwatch.

This wristwatch has a substantially same structure as that of the first embodiment except that its exterior case 30 has a structure different from that of the first embodiment, as shown in FIG. 4.

That is, this exterior case 30 is formed in a ring shape by a soft synthetic resin such as urethane resin in the same manner as that in the first embodiment, as shown in FIG. 4. In this case as well, the exterior case 30 is attached to the upper part of the main body case 4 by the double-sided adhesive tape 16 while covering the upper outer circumferential portion of the main body case 4.

In the outer circumferential portion of the exterior case 30, the plurality of first notch sections **5*a* are provided corresponding to the outer peripheries of the upper parts of the cylindrical sections 15*a* of the plural button attachment sections 15 on the main body case 4, as with the first embodiment. Each of these first notch sections 5*a* is formed in an arc shape that is open to the lower side. As a result, the exterior case 30 is structured such that, when this exterior case 30 is arranged on the upper outer circumferential portion of the main body case 4, the outer peripheries of the upper parts of the cylindrical sections 15*a* of the plural button attachment sections 15 on the main body case 4 are arranged in the plurality of first notch sections 5*a***, respectively.

Also, this exterior case 30 is formed such that at least portions of its outer circumferential portion covering the upper outer circumferential portion of the main body case 4 which correspond to the band attachment sections 19 of the cover member 3 have a vertical length longer than that of the outer circumferential portion of the exterior case 5 of the first embodiment, as shown in FIG. 4. As a result, the exterior case is structured such that the lower rim of its outer circumferential portion is arranged to be interposed between the inner end portions of the band attachment sections 19 and the main body case 4.

That is, the exterior case 30 is structured such that the lower rim of its outer circumferential portion is arranged to be fitted into an upper area of the space S1 between the inner end portions of the pair of attachment projections 24 of each band attachment section 19 and the outer circumference surface of the main body case 4 and interposed therebetween, as shown in FIG. 4. The remaining area of the space S1 is located under the lower rim of the outer circumferential portion of the exterior case 30.

In this wristwatch, since the cover member 3 is attached to the undersurface of the back cover 8 while covering the outer circumferential portion of the case member 2, external impacts received by the wristwatch case 1 are mitigated by the cover member 3, as with the first embodiment. As a result of this structure, the case member 2 is favorably protected by the cover member 3, or in other words, the impact resistance is increased.

That is, when the wristwatch case 1 receives an impact from the back surface side, the cover member 3 protects the back cover 8 and the main body case 4 from the impact on the back surface side by the cover main body 17 arranged on the undersurface of the back cover 8, as with the first embodiment. When the wristwatch case 1 receives an impact from the outer circumference side, the main body case 4 is protected from this impact by the outer circumferential portion of the exterior case 5, the outer circumferential cover section 18 arranged around the outer circumference of the main body case 4, and the band attachment sections 19.

In this case as well, when the wristwatch is dropped face up and the lower outer end portions of the pair of attachment projections 24 of each band attachment section 19 on the cover member 3 come in contact with the contact surface T of a floor or the like, the lower outer end portions of the pair of attachment projections 24 are pressed upward by the drop impact and the pair of attachment projections 24 is flexurally deformed such that the inner end portions thereof approach the outer circumferential surface of the main body case 4.

Here, since the lower rim of the outer circumference portion of the exterior case 30 has been arranged to be fitted into the upper area of the space S1 between the inner end portions of the pair of attachment projections 24 of each band attachment section 19 and the outer circumference surface of the main body case 4 and interposed therebetween, and the space S1 has been formed under the lower rim of the outer circumference portion of the exterior case 30, the pair of attachment projections 24 is flexurally deformed toward the outer circumferential surface of the main body case 4 with the lower portion of the outer circumferential cover section 18 on the outer circumferential portion of the cover main body 17 as a fulcrum.

That is, since the exterior case 30 is made of a soft synthetic resin such as urethane resin, and the lower rim of the outer circumference portion of the exterior case 30 is interposed between the inner circumferential surface of the outer circumferential cover section 18 of the cover member 3 and the outer circumferential surface of the main body case 4, impacts due to the drop of the wristwatch case 1 are mitigated by the resilience of the lower rim of the outer circumference portion of the exterior case 30, whereby the watch module 10 in the wristwatch case 1 can be prevented from being affected by the impacts.

As described above, in this embodiment, the same advantageous effect as the first embodiment can be acquired, and impacts due to the drop of the wristwatch case 1 can be mitigated by the lower rim of the outer circumference portion of the exterior case 30 because of the structure where the lower rim of the outer circumference portion of the exterior case 30 has been arranged to be fitted into the upper area of the space S1 formed between the outer peripheral surface of the main body case 4 and the inner end surfaces of the band attachment sections 19 of the cover member 3.

That is, in this wristwatch, since the exterior case 30 is made of a soft synthetic resin such as urethane resin, and the lower rim of the outer circumference portion of the exterior case 30 is interposed between the upper inner end portions of the pair of attachment projections 24 of each band attachment section 19 and the outer circumference surface of the main body case 4, impacts due to the drop of the wristwatch case 1 can be mitigated by the lower rim of the outer circumference portion of the exterior case 30. As a result, the watch module 10 in the wristwatch case 1 can be prevented from being affected by the impacts, and the impact resistance can be increased.

In the above-described second embodiment, the structure has been described in which the lower rim of the outer circumference portion of the exterior case 30 is arranged to be fitted into the upper area of the space S1 formed between the inner end portions of the pair of attachment projections 24 of each band attachment section 19 and the outer circumferential surface of the main body case 4. However, the present invention is not limited thereto. For example, a structure may be adopted in which the lower rim of the outer circumference portion of the exterior case 30 is arranged to be fitted into the entire area of the space S1 formed between the inner end surfaces of the pairs of attachment projections 24 and the outer circumferential surface of the main body case 4.

Also, in the above-described first and second embodiments, the case has been described in which the wristwatch is dropped face up and comes in contact with the contact surface T of a floor or the like. However, with the present invention, the same advantageous effect as the first and second embodiments can be acquired even when, for example, the wristwatch case 1 receives an impact from above with it being arranged on a placement surface of a table or the like and the lower outer end portions of the pair of attachment projections 24 of each band attachment section 19 of the cover member 3 being in contact with the placement surface.

Moreover, in the above-described first and second embodiments, the case member 2 is constituted by the hard body case 4 and the soft exterior case 5 or 30. However, the present invention is not limited thereto. For example, the case member 2 may be constituted by the hard body case and a hard exterior case, or may be constituted by only the hard body case.

Furthermore, in the above-described first and second embodiments, the coupling pin 26 is a spring rod. However, the present invention is not limited thereto. For example, the coupling pin 26 may be a screw member in which one rod-shaped member is provided with a male screw section and the other rod-shaped member is provided with a female screw section, or may be a simple rod-shaped member.

Still further, in the above-described first and second embodiments, the present invention has been applied in a wristwatch. However, the present invention is not necessarily required to be applied in a wristwatch. For example, the present invention may be applied in various types of timepieces such as a travel watch, an alarm clock, a table clock, and a wall clock. Also, the present invention is not necessarily required to be applied in a timepiece. For example, the present invention may be applied in an electronic device such as a portable communication device or a portable terminal device.

While the present invention has been described with reference to the preferred embodiments, it is intended that the invention be not limited by any of the details of the description therein but includes all the embodiments which fall within the scope of the appended claims.

What is claimed is:

1. A manufacturing method for manufacturing a case, the manufacturing method comprising:

attaching a first side of a back cover to a case member; and attaching a cover member to the back cover, wherein the cover member comprises a cover main body, an outer circumferential cover section and band attachment sections, wherein the cover main body, the outer circumferential cover section and the band attachment sections are integrally formed, and wherein the attaching the cover member to the back cover comprises attaching the cover main body to a second side of the back cover opposite to the first side of the back cover such that:

at least a portion of the outer circumferential cover section and at least a portion of each of the band attachment sections are provided on the first side of the back cover to cover an outer circumferential surface of the case member; and a space is provided between the outer circumferential surface of the case member and an inner end surface of each of a pair of attachment projections of the each of the band attachment sections corresponding thereto and an upper inner end portion of the each of the pair of attachment projections is arranged in contact with a lower rim of an outer circumferential portion of an exterior case attached to an upper outer circumference of the case member.

2. The manufacturing method according to claim 1, further comprising:

arranging a ring-shaped parting member on an upper opening of a main body case of the case member;

attaching a glass and a packing to the main body case to press the ring-shaped parting member against the main body case by the glass to fix the ring-shaped parting member; and attaching an exterior case to an upper outer circumferential portion of the main body case.

3. The manufacturing method according to claim 1, further comprising:

arranging a buffer sheet between the module and the first side of the back cover, wherein the first side of the back cover is attached to the case member after the buffer sheet is arranged between the module and the first side of the back cover, and wherein attaching the first side of the back cover to the case member comprises attaching the first side of the back cover and an undersurface of the main body case with a waterproof ring between the back cover and the main body case by a plurality of screws.

4. A manufacturing method for manufacturing a case, the manufacturing method comprising:

attaching a first side of a back cover to a case member; and attaching a cover member to the back cover, wherein the cover member comprises a cover main body and band attachment sections, and wherein the attaching the cover member to the back cover comprises attaching the cover main body to a second side of the back cover opposite to the first side of the back cover and attaching the cover member such that at least a portion of each of the band attachment sections are provided on the first side of the back cover to cover an outer circumferential surface of the case member in a state where a space is formed between the outer circumferential surface of the case member and an inner end surface of each of a pair of attachment projections of the each of the band attachment sections and that an upper inner end portion of the each of the pair of attachment projections is arranged in contact with a lower rim of an outer circumferential portion of an exterior case attached to an upper outer circumference of the case member.

5. The manufacturing method according to claim 4, further comprising:

arranging a ring-shaped parting member on an upper opening of a main body case of the case member;

attaching a glass and a packing to the main body case to press the ring-shaped parting member against the main body case by the glass to fix the ring-shaped parting member; and attaching an exterior case to an upper outer circumferential portion of the main body case.

6. The manufacturing method according to claim 5, further comprising:

inserting a module into the main body case, wherein the first side of the back cover is attached to the case member after the module is inserted into the main body case.

7. The manufacturing method according to claim 6, arranging a buffer sheet between the module and the first side of the back cover, wherein the first side of the back cover is attached to the case member after the buffer sheet is arranged between the module and the first side of the back cover, and wherein attaching the first side of the back cover to the case member comprises attaching the first side of the back cover and an undersurface of the main body case with a waterproof ring between the back cover and the main body case by a plurality of screws.

8. A manufacturing method for manufacturing a timepiece, the manufacturing method comprising:

the manufacturing method according to claim 1; and attaching timepiece bands to the band attachment sections of the cover member.

9. A manufacturing method for manufacturing a timepiece, the manufacturing method comprising:

the manufacturing method according to claim 5; and attaching timepiece bands to the band attachment sections of the cover member.

* * * * *